3,199,191
METHOD OF MACHINING LIP-TYPE SEALS
Robert L. Dega, Utica, Mich., assignor to General Motors Corporation, Detroit, Mich., a corporation of Delaware
No Drawing. Filed Aug. 1, 1960, Ser. No. 46,338
1 Claim. (Cl. 29—529)

This invention relates to a method of producing a flexible lip-type seal having precisely controlled dimensional characteristics.

Fluid seals having flexible lip portions adapted for wiping sealing engagement with a rotating shaft have been known for many years and the art of attempting to effect a non-leaking relationship between a seal and a rotating shaft is highly developed. Such sealing devices have been provided with spring elements, multiple sealing faces, serrations and grooves and the like in countless varities and modifications in attempt to improve sealing qualities. The subject seals have been preferably fabricated from any natural or synthetic rubber or plastic which is elastic, pliable and deformable, and which is deterioration resistant to the material or materials to be sealed (hereinafter referred to as the sealant). In general, any moldable material which has sufficient resiliency to provide an adequate seal has been found to be satisfactory.

As far as is known, all lip-type seals presently manufactured are molded and trimmed so that the accuracy of the seal part is dependent on the mold and the trimming operation. Parts made in such a manner have proven to be inadequate for critical high speed application. As disclosed in my copending application "Fluid Seal Construction," S.N. 46,412, filed August 1, 1960, now abandoned, sealing qualities can be greatly improved by precisely controlling dimensional characteristics.

It is a principal object of this invention to provide a method of machining flexible lips of molded fluid seals to obtain accuracies of the same degree as found in metallic machining operation. It is a further object of this invention to provide cutting tools which are satisfactory for the machining method. Other objects and advantages will be disclosed in the following detailed description.

One of the most important factors in producing high quality lip-type seals is the concentricty of the lip portion relative to the outer case and the concentricity of the garter spring groove to the lip. In standard molding procedures, both of the aforementioned concentricity factors are variably due to mold mismatch which produces large variations in lip pressure around the seal so that sections of the seal lip are often worn away very rapidly due to uneven lip pressures. In addition, contact surface width of the seal lip is critical and should be closely maintained within precise limits for many applications. A machined seal lip will eliminate the aforementioned variables and thereby eliminate one of the major causes of seal failures.

I have discovered that the elastomeric materials of which the seal lips are manufactured may be machined after the molding thereof by cooling the molded stock to an inelastic state and maintaining it in a hardened condition during the entire machining cycle. A suitable coolant for lowering the temperature of the molded stock is Oleum, a petroleum product similar to kerosene. Any such liquid which can obtain the necessary temperature reduction of the stock may be used. Oleum may be satisfactorily used to obtain temperatures of as low as −80°. The coolant is refrigerated by pumping it through a conventional heat exchanger which holds Dry Ice or other suitable refrigerating means and from there, the coolant is continuously conveyed to the work area and back to the heat exchanger; recirculating through the heat exchanger where it gives up the latent heat extracted from the stock. In order to machine the stock it is mounted on a lathe or other suitable chip forming type machine and rotated. Pumping means are provided to deliver coolant onto the rotating annulus and control means are provided to thermostatically control the coolant temperature as it is delivered to the work area to obtain the necessary degree of hardening for the particular seal elastomer used. In the process of form tooling rubber or polymer seal elements with chip forming type apparatus, it is necessary to closely control temperatures so that maximum cutting efficiency can be obtained from cutting tools. For example, Buna stock requires a machining temperature of between minus 30° F. and minus 40° F. for most efficient machining. If the stock becomes too cold, icing at the tool bit will cause the tool bit to slide over the stock and prevent accurate machining. Conversely, if the stock is too warm, the tool bit will roll and chatter in addition to causing deformation of the stock under the relatively light tool bit pressure. A series of tool cutting angles have been developed to provide the greatest cutting efficiency so that the seal body will not soften during the machining cycle. It has been determined that a cutting tool with a rake angle between 20 and 30 degrees and a clearance angle of between 15 and 25 degrees is best suited for the machining method. In some cases, tool marks developed during the machining operation may be sufficiently detrimental to good sealing to require a final operation of plunge grinding to obtain the desired seal lip surface qualities. Plunge grinding leaves no lead marks and provides a substantially continuous sealing surface.

By the method provided a seal element can be form tooled in a manner which lends itself to high speed automation. In addition, the seal dimensions can be accurately controlled to a degree heretofore unknown.

I claim:

A method of forming elastic lip seals comprising, molding a blank of deformable elastic material, mounting the blank on a rotatable holding fixture, rotating the holding fixture at a machining speed, conveying coolant at a predetermined temperature to the rotating blank in sufficient amounts to extract latent heat from the blank, engaging said blank with a chip-forming tool while said blank is being rotated by said fixture after said blank has been rendered inelastic to remove discrete particles from said blank and form a plurality of surfaces of revolution thereon whereby the blank takes the form of a lip-type seal, and controlling the temperature of the coolant conveyed to the blank while the chip-forming tool is engaging the blank so that the tool will cut discrete particles from the blank while continuously engaging the blank without intermittently disengaging and chattering.

References Cited by the Examiner
UNITED STATES PATENTS

| | | | |
|---|---|---|---|
| 1,710,211 | 4/29 | Gammeter | 264—28 |
| 2,167,215 | 7/39 | Leary. | |
| 2,203,937 | 6/40 | Barley. | |
| 2,280,259 | 4/42 | Polley. | |
| 2,380,653 | 7/45 | Kopplin | 18—48 XR |
| 2,586,532 | 2/52 | Granfield. | |
| 2,844,352 | 7/58 | Dahl | 29—529 X |
| 2,855,664 | 10/58 | Griffith et al. | 29—424 |
| 2,905,064 | 9/59 | Nielsen | 90—59 |
| 3,108,370 | 10/63 | Peickii et al. | 29—529 |
| 3,112,851 | 12/63 | Collins | 83—15 X |

WHITMORE A. WILTZ, *Primary Examiner.*
HYLAND BIZOT, *Examiner.*